(12) United States Patent
Fee

(10) Patent No.: US 8,913,625 B2
(45) Date of Patent: Dec. 16, 2014

(54) SYSTEM AND METHOD FOR PROVIDING SERVICE-AGNOSTIC NETWORK RESOURCES

(75) Inventor: John A. Fee, Garland, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2841 days.

(21) Appl. No.: 11/295,879

(22) Filed: Dec. 7, 2005

(65) Prior Publication Data

US 2006/0133405 A1 Jun. 22, 2006

Related U.S. Application Data

(60) Provisional application No. 60/637,405, filed on Dec. 17, 2004.

(51) Int. Cl.
*H04L 1/00* (2006.01)
*H04Q 3/00* (2006.01)
*H04L 12/28* (2006.01)

(52) U.S. Cl.
CPC ............ *H04Q 3/005* (2013.01); *H04L 12/2856* (2013.01)
USPC ............................ 370/437; 370/466; 370/230

(58) Field of Classification Search
CPC ......... H04L 1/00; H04L 67/306; H04L 67/30; H04L 29/08918; H04L 29/08927
USPC .......................................... 370/389, 230, 337
See application file for complete search history.

(56) References Cited

U.S. PATENT DOCUMENTS 7,385,998 B2 * 6/2008 Wang ............................ 370/420
7,609,637 B2 * 10/2009 Doshi et al. .................... 370/235
2002/0089927 A1 * 7/2002 Fischer et al. ................. 370/229
2002/0154755 A1 * 10/2002 Gourraud ....................... 379/219
2003/0123446 A1 * 7/2003 Muirhead et al. ............. 370/392
2005/0053064 A1 * 3/2005 Wang ............................ 370/389
2005/0195741 A1 * 9/2005 Doshi et al. ................... 370/230

OTHER PUBLICATIONS

IEEE Standards for Local and Metropolitan Area Networks: Virtual Bridged Local Area Networks, IEEE Standard 802.1Q-1998, copyright 1999.
Aboba et al., "Criteria for Evaluating AAA Protocols for Network Access", Internet Engineering Task Force, Network Working Group, Request for Comments 2989, Nov. 2000.
Bryant et al., "PWE3 Architecture", Internet Engineering Task Force, Pseudo-Wire Edge-to-Edge (PWE3) Working Group, Internet Draft draft-ietf-pwe3-arch-06.txt, Oct. 2003.

(Continued)

*Primary Examiner* — Melanie Jagannathan
*Assistant Examiner* — Jason Harley

(57) ABSTRACT

System and method for providing service-agnostic network resources is provided. An embodiment receives an indication that a user is requesting services at a new location, retrieves an access profile, which includes service parameters for services to which the user subscribes, and causes the access network and the programmable network to be reconfigured to provide to the user's services at the new location. The indication may be generated automatically or manually. A network control database that stores network topology information and/or configuration instructions may be used to reconfigure the network resources. In this manner, the access network and the programmable network may be reconfigured to allow the user to move from location to location and from device to device and continue to receive a consistent set of transport services, even involving multiple forms of transport.

32 Claims, 4 Drawing Sheets

(56) References Cited

OTHER PUBLICATIONS

Croft et al., "Bootstrap Protocol (BOOTP)", Internet Engineering Task Force, Network Working Group, Request for Comments 951, Sep. 1985.

Rigney et al., "Remote Authentication Dial in User Service (RADIUS)", Internet Engineering Task Force, Network Working Group, Request for Comments 2865, Jun. 2000.

Simpson, W., "The Point-to-Point Protocol (PPP)", Internet Engineering Task Force, Network Working Group, Request for Comments 1661, Jul. 1994.

* cited by examiner

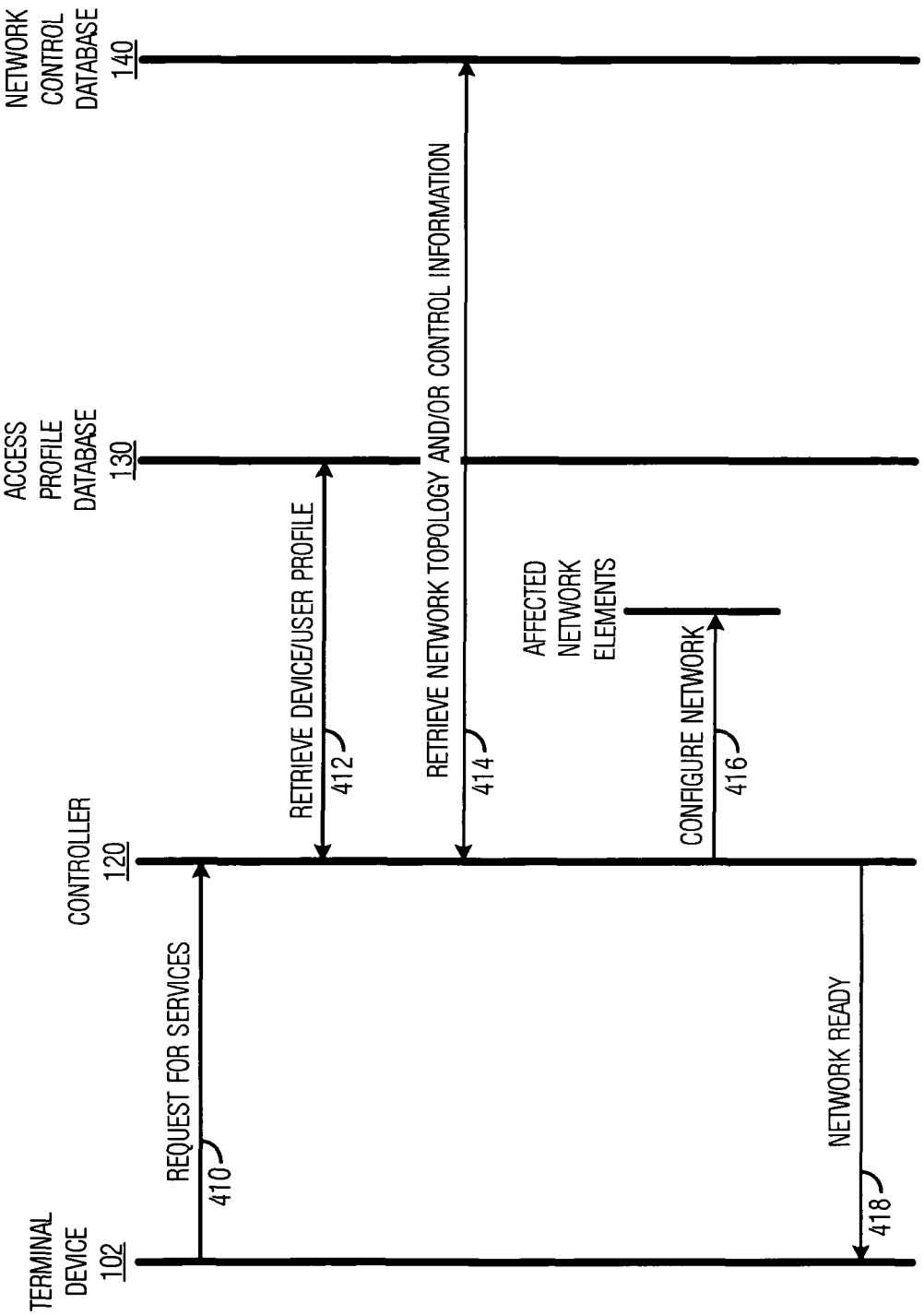

SYSTEM AND METHOD FOR PROVIDING SERVICE-AGNOSTIC NETWORK RESOURCES

PRIORITY CLAIM AND CROSS-REFERENCE TO RELATED APPLICATIONS

The present application claims priority to U.S. Provisional Patent Application Ser. No. 60/637,405, filed Dec. 17, 2004, entitled "System And Method For Providing Service-Agnostic Network Resources," assigned to the assignee of the present application and incorporated herein by reference its entirety.

The present application is also related to the following co-pending applications, which are assigned to the assignee of the present application and incorporated herein by reference in their entireties:

U.S. patent application Ser. No. 10/858,502, filed on Jun. 1, 2004 and entitled "System and Method for a Communications Access Network;"

U.S. patent application Ser. No. 10/858,501, filed on Jun. 1, 2004 and entitled "System and Method for Controlling Communication Flow Rates;"

U.S. patent application Ser. No. 10/860,803, filed on Jun. 3, 2004 and entitled "System and Method for Indicating Classification of a Communications Flow;"

U.S. patent application Ser. No. 10/858,491, filed on Jun. 1, 2004 and entitled "Apparatus and Method for Terminating Service Emulation Instances;"

U.S. patent application Ser. No. 11/141,374, filed on May 31, 2005 and entitled "Apparatus and Method for Providing a Network Termination Point;"

U.S. patent application Ser. No. 10/858,503, filed on Jun. 1, 2004 and entitled "Method and Apparatus for Processing Labeled Flows in a Communications Access Network;"

U.S. patent application Ser. No. 10/858,517, filed on June 1, 2004 and entitled "System And Method For Providing A Multiple-Protocol Crossconnect;"

U.S. patent application Ser. No. 10/859,057, filed on Jun. 2, 2004 and entitled "Providing Applets to Remote Devices in a Telephony Network;"

U.S. patent application Ser. No. 10/858,868, filed on Jun. 2, 2004 and entitled "System and Method for Monitoring, Controlling and Provisioning a Telecommunications Access Network;"

U.S. patent application Ser. No. 10/859,463, filed on Jun. 2, 2004 and entitled "Error Detection and Reporting;"

U.S. patent application Ser. No. 10/860,609, filed on Jun. 3, 2004 and entitled "System and Method for Transporting Time-Division Multiplexed Communications through a Packet-Switched Access Network;"

U.S. patent application Ser. No. 10/859,468, filed on Jun. 2, 2004 and entitled "Apparatus and Method for Testing and Fault Isolation in a Communication Network;" and U.S. patent application Ser. No. 10/858,525, filed on Jun. 1, 2004 and entitled "System And Method For Managing Communications In An Access Network."

TECHNICAL FIELD

The present invention relates generally to a system and method for providing communications services and, more particularly, to a system and method for providing service-agnostic network resources, thereby providing device and/or user portability.

BACKGROUND

Traditionally, a telecommunications network is operated by a service provider to provide communications services to a large number of users, often covering a large geographical area. Each user, such as a business or an individual, is typically coupled to the network through an access link of some nature. An access link carries communication traffic between a user's location and a so-called "service edge" where the service provider has facilities to serve many users in a given vicinity. Each user may need a particular type of communication service, such as time-division multiplexed (TDM) communications, Asynchronous Transfer Mode (ATM) communications, frame relay (FR) communications, or even a mixture of these.

Access links often take the form of telephone subscriber loops which are leased from a local telephone company. A subscriber loop may be used to carry data in the form of TDM signals, such as a T1 or DS3 link. To establish such an access link, a user or service provider must order the facilities from the local telephone company. It is costly and time-consuming to obtain an access link, often requiring maintenance personnel to physically configure network elements. Consequently, an access link has tended to be a statically provisioned resource.

For example, a business enterprise operating in a metropolitan office building may contract with a service provider to provide communications services. A wideband/broadband connection to the building may be provided by the service provider or may be leased through another party such as a local telephone company. This involves initial installation cost and delay as well as recurring charges for the leased facility. Should the business enterprise, or a user in the enterprise, move to a different location and require the same array of access communications, the process (and costs and delays) of ordering and establishing an access connection at the new location would be repeated. Added costs and delays may also be incurred when a customer's needs expand to necessitate installing additional access connections.

Therefore, to reduce the costs and delays associated with providing services, and a variety of types of services, there is a need for a service-agnostic network resource such that users may move from location to location and have access to their services.

SUMMARY OF THE INVENTION

These and other problems are generally solved or circumvented, and technical advantages are generally achieved, by preferred embodiments of the present invention which provides service-agnostic network resources, thereby providing device and/or user portability.

In accordance with an embodiment of the present invention, a method is provided for a service-agnostic network resource. The method comprises receiving an indication that a user is coupled to a point of access to the service-agnostic network resource and is requesting a set of transport services corresponding to one or more of the different forms of transport, retrieving an access profile, the access profile including service parameters for transport services to be made available to the user, and causing an access network and a programmable network to be configured to provide the set of transport services at the point of access in accordance with the access profile.

In accordance with another embodiment of the present invention, a system for a service-agnostic network resource is provided. The system comprises a controller communicatively coupled to one or more programmable networks and one or more access networks, an access profile database communicatively coupled to the controller, and a network control database communicatively coupled to the controller. The controller is configured to receive an indication that a user is requesting services from a point of access, to retrieve an access profile from the access profile database, the access profile including service parameters for services which are to be made available to the user, and to cause the programmable network to be reconfigured to provide subscribed-to services at the new location.

It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is a message flow diagram that may be used in accordance with an embodiment of the present invention.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to specific network configurations, processes, and the like for illustrative purposes only. Furthermore, while specific network configurations are illustrated and discussed herein, it is noted that network configurations may vary to include fewer or additional elements, such as IP routers, gateways, bridges, ATM switches, frame relay switches, firewalls, Ethernet switches, and the like. Aspects of the present invention are equally applicable to many types and configurations of networks and communications protocols.

It is further noted that, unless indicated otherwise, all functions described herein may be performed in either hardware or software, or some combination thereof. In an embodiment, the functions are performed by a processor such as a computer or an electronic data processor in accordance with code such as computer program code, software, and/or integrated circuits that are coded to perform such functions, unless indicated otherwise.

Generally, the present invention provides a system and a method in which an access network and a programmable network, such as a core network, together provide a service-agnostic network resource. The programmable network may represent any type of communications service, such as TDM, internet protocol (IP), FR, ATM, or the like, and is communicatively coupled to the access network via a service edge. In accordance with the teachings of the present invention, the access network provides one or more logical pipes or tunnels through which communications may be sent between a customer edge device and a service edge device, wherein communications may be identified by one or more carrier tags that are applied to the traffic and which have significance for how the traffic is to be handled in the access network. In this manner, the access network and the programmable network may be quickly and easily reconfigured to support a user moving from port to port or from device to device.

Figure 1:
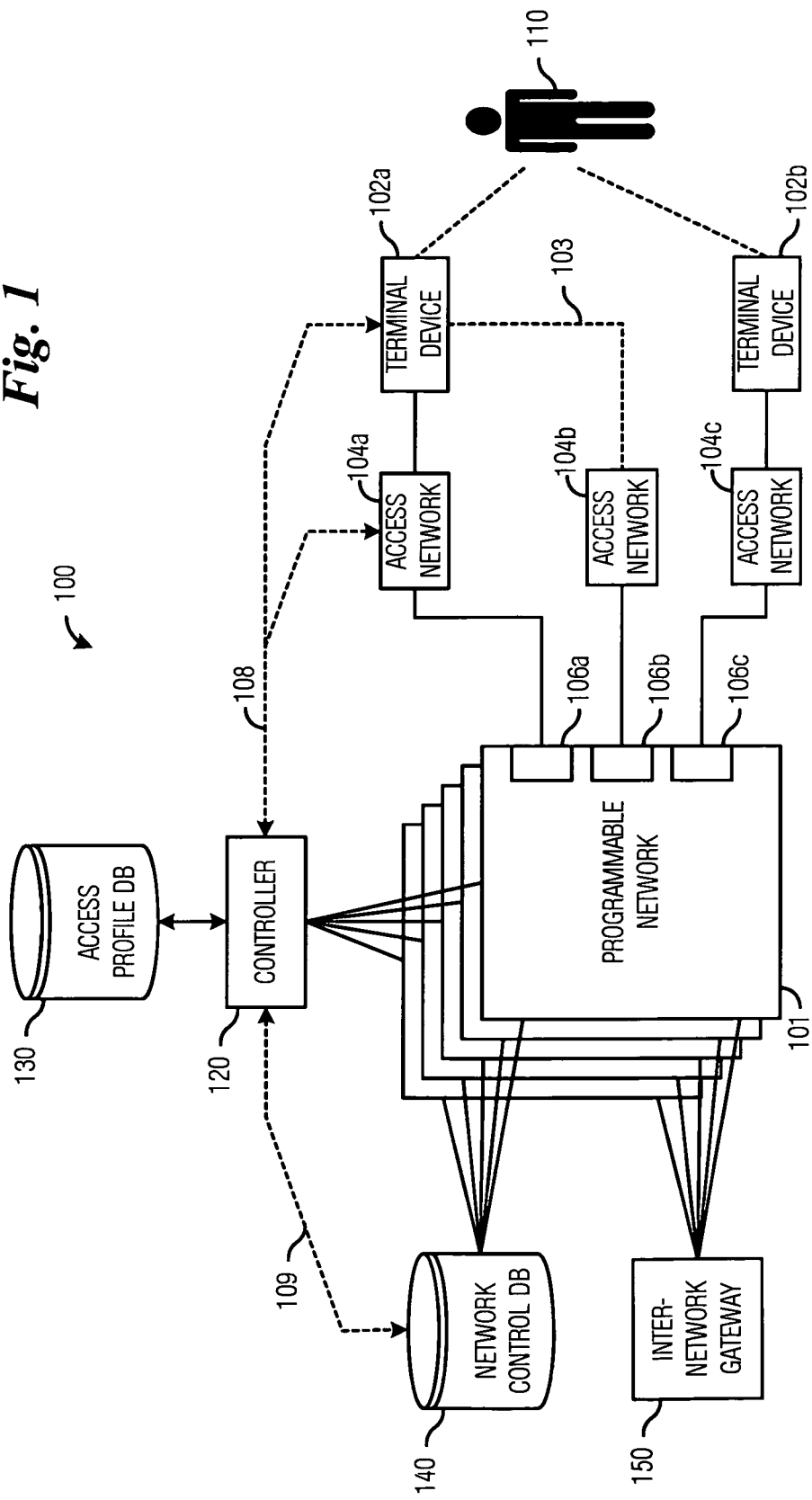
FIG. 1 illustrates a telecommunications network in accordance with an embodiment of the present invention.

FIG. 1 illustrates a telecommunications network 100 in accordance with an embodiment of the present invention. The telecommunications network 100 includes a programmable network 101 comprising one or more networks capable of providing communications and/or other services to users coupled thereto. The programmable network 101 may provide various forms or types of transport, for example, circuit-switched TDM services, IP services, ATM services, FR services, or the like. In an embodiment, the programmable network 101 may comprise a single, general-purpose transport network that is adaptable to carry traffic of various types and having various service quality requirements.

In another embodiment, the programmable network 101 may comprise multiple networks that cooperate to transport traffic or may comprise multiple networks that cover much the same territory, but are used to handle different traffic types for which they are each particularly well-suited. For example, the programmable network 101 may comprise a network of TDM switches (such as a network of Class 3 telephone switches), an ATM and/or a frame relay network covering much the same geographical territory as the TDM network, a network of IP routers, and/or the like. While each network may overlap or cover much the same geographical territory, each may be designed to efficiently carry particular types of traffic or exhibit particular properties that are amenable to certain types of traffic.

These programmable networks may operate collectively or individually to meet the needs of the users and may all be controlled by a common control plane. When controlled in the manner described below, programmable network 101 may be regarded as a general-purpose configurable service-providing resource.

A user 110 may access communications services, or other services provided by programmable network 101, through an access connection of some nature. User 110 may employ a terminal device 102a to interface with services and applications. For example, the terminal device 102a may be a telephone, or equipped to function as a telephone, and the programmable network 101 may provide telephony service between the user 110 and other users. As another example, the terminal device 102a may be a data terminal, such as a desktop, laptop or palmtop computer through which the user 110 may access various applications, such as an e-mail client, a web browser, or a database. In this case, the programmable network 101 may provide data communications services such as accessing remote servers or the public Internet, performing data communications with other parties, or the like. In some cases, the terminal device 102a may flexibly provide a user interface to various types of services individually or simultaneously.

The terminal device 102a may be coupled to the programmable network 101 via an access network 104a or other access connection, which may take the form of a network of communications links, such as a telephone subscriber loop, a wireless connection, an electrical or optical cable, switches, routers, multiplexors, demultiplexors, and the like. The communications between the terminal device 102a and the programmable network 101 over the access network 104a may involve DSL, WiFi or wireless broadband, cable modem, T1, DS3, or SONET OCn signals.

To provide a desired complement of services to the user 110, the terminal device 102a may engage in communications along the access network 104a involving any or all of Ethernet, ATM, frame relay, TDM, or other communications. An example of the access network 104a is provided below with reference to FIG. 2.

The access network 104a is communicatively coupled to the programmable network 101 via a service edge 106a. The access network 104a and the service edge 106a may be provisioned or configured to implement a variety of transport services. Furthermore, the access network 104a may flexibly support a mixture of these services by using carrier-tagged flows, such as pseudowires. In accordance with a suitable design, the access network 104a and the service edge 106a may be quickly provisioned or configured to adapt to what is required along the access network 104a by the user 110 and the terminal device 102a. Having the access network 104a and the service edge 106a provisioned, the programmable network 101 may be quickly and easily reconfigured to provide the required services and routing.

An example of an access network that may be used in conjunction with the present invention is described in U.S. patent application Ser. No. 10/858,525, which is incorporated herein by reference.

To illustrate a scenario wherein an embodiment of the present invention may be usefully applied, assume that the terminal device 102a is engaged in a mixture of communications with the programmable network 101 (perhaps involving multiple forms of transport such as ATM, Ethernet, TDM, etc.) and that the access network 104a and the service edge 106a are provisioned or configured to provide this complement of communication services. If the terminal device 102a is removed from access network 104a and coupled to a different access network, such as access network 104b, as illustrated by the dotted line 103, it is desirable that, to the extent possible, the same set of transport services that were formerly provisioned along the access network 104a and a service edge 106a become provisioned along the new access network 104b and the service edge 106b.

In another example, the user 110 may switch terminal devices, e.g., from terminal device 102a to terminal device 102b, and may wish to utilize the transport services that were formerly provisioned along the access network 104a and the service edge 106a. In this case, the access provisioning "moves with the user" and may or may not be a function of which terminal device or access port is being used.

Hereinafter, terminal devices 102a-b are collectively referred to as the terminal device 102, the access networks 104a-c are collectively referred to as the access network 104, and the service edges 106a-c are collectively referred to as the service edge 106.

A controller 120 may be communicatively coupled to the programmable network 101 and configured to initiate or change the provisioning of the programmable network 101, the service edge 106, and/or the access network 104 to accommodate the user's request. An access profile database 130 communicatively coupled to the controller 120 may store the user's profile regarding the service types to which the user subscribes, services characteristics, QoS parameters, and the like.

The controller 120 may use profile information from the access profile database 130 to determine the authenticity of the request and determine to what extent the request may be fulfilled. The controller 120 may issue control communications to the programmable network 101 to carry out switching, routing, or any other action required to provide the requested service. Additionally, controller 120 may directly or indirectly control the configuration of the service edge 106. This configuration may include mapping of flows or virtual circuits, for example, as well as policing, marking or shaping parameters to be applied to flows.

A signaling connection 108 between the controller 120 and the access network 104a and/or the terminal device 102 provides a signaling path for provisioning requests. Via the signaling along signaling connection 108, the terminal device 102 may indicate a specific access profile within the access profile database 130. This profile may be associated with the user 110, with the terminal device 102, or with other attributes that may have a bearing upon how the access connection should be provisioned. The signaling connection 108 may be a manual notification process (e.g., fax, email, voice call), a direct connection via a LAN, WAN, modem, or the like, an in-band/out-of-band signaling channel, or the like. The signaling connection 108 may be carried outside of programmable network 101 or may be achieved by transport within programmable network 101. In some embodiments, the signaling connection 108 may be performed via a user-network interface (UNI) presented at, or available through, the service edge 106, the programmable network 101, a non-programmable network (not explicitly shown), or a combination thereof. A UNI may be viewed as a demarcation point at the service edge or elsewhere within network 100 and may encompass interfaces which permit monitoring network health or performance and quality of service. The UNI may be implemented by tagging signaling traffic as high priority, either within programmable network 101 or in a non-programmable network, to ensure expeditious forwarding of signaling messages. The UNI may also be optionally implemented in a tunneling or pseudowire fashion between the terminal device and controller. Many approaches are possible by which a terminal device 102 may communicate to controller 120, indicating, for example, that the device has become coupled at a certain access point, is associated with a given user or is requesting transport services.

In some embodiments, it may be possible to adopt a convention that every terminal device 102 at least supports a given common layer 2 transport (regardless of which transport service types the device/user actually requires) and observes a given protocol or uses a given channel (such as a particular VLAN tag number) to make contact with the controller. Alternatively, one may provide, for each type of transport service provided (ATM, FR, Ethernet, etc.), a well known interface, such as given port, address, VCI/VPI, DLCI, or the like for communicating with the controller. In some cases, a device may be able to initially broadcast or request address resolution to find a controller, proxy or registrar using the Address Resolution Protocol (ARP) or, at a higher level, a Domain Name System (DNS) lookup. A service edge may be equipped to recognize, for example, messages within a tunnel or flow that are signaling related and need to be diverted to the controller.

A protocol for communications among the device and the controller may be proprietary or may be some agreed upon standard, such as an extended or modified version of the Session Initiation Protocol (SIP). User-network interfaces are known, in Frame Relay and ATM transport for example, for control communications between a device and a service edge or access network point. For example, mechanisms are well known by which a device may establish contact and carry out messaging to initiate communications sessions. For example, a wireless device may initialize contact with an access point or a mobile telephone switching office, a SIP telephone may contact a SIP registrar and find a SIP proxy server when a communication is to be established, or, in the context of a 3G IP Multimedia Subsystems (IMS) architecture, a device may invoke services by communicating with a service executing platform (an S-CSCF) via a proxy call session control function (P-CSCF). The controller can configure the service edge in various ways such as arranging for mapping of ports, virtual circuits, channels, flows, tunnels, etc. Where pseudowires or L2TP tunnels are used, the controller may cause service edge or access network elements to route and aggregate traffic in a certain way or to emulate certain other types of transport.

Even customer premise or mobile/portable devices may be controlled or configured in some manner by the controller or other functions within programmable network 101. For one example, the Dynamic Host Control Protocol (DHCP) or the like may be used to assign a unique address to the device. Another facet of configuring CPE devices is described in the aforementioned co-pending and commonly assigned U.S. patent application Ser. No. 10/858,868, wherein a specific VLAN is set aside for configuring and managing one or more remote devices at the customer premise. Another UNI is described in the aforementioned co-pending and commonly assigned U.S. patent application Ser. No. 11/141,374, filed on May 31, 2005 and entitled "Apparatus and Method for Providing a Network Termination Point." One may also refer to such industry practices as the point-to-point (PPP) protocol described in IETF document RFC 1661 or the Metro Ethernet Forum's UNI technical specification (document MEF 11) for helpful information on yet other approaches. Other IETF documents that describe other potentially useful approaches in this regard include RFC 2865, RFC 2989 and RFC 951.

Those of ordinary skill can envision various ways, such as those just described, for providing such a user-network interface and the present invention is not limited to any particular manner of accomplishing this interface.

The location of a terminal device 102 may be automatically detected, such as automatically detecting an IP address of a telephone configured to use the Session Initiation Protocol (SIP). Another example may be the ability for a user to enter a user identification code on a terminal device. The terminal device may then signal the controller 120 via the signaling connection 108 of the user's new location, which may then be reconfigured accordingly. It should be noted that the signaling connection 108 may also be connected to each of the access networks 104a-c.

Also shown in FIG. 1 is a network control database 140, which may comprise a variety of types of information pertaining to how the programmable network 101 is configured at any point in time, as well as how the programmable network 101 may be controlled to provide communication services in response to requests from users. For example, the network control database 140 may contain network physical and logical topology information and may contain data and/or executable instructions that may be invoked to cause the programmable network 101 to provide any necessary form of transport, such as ATM, FR, TDM, Ethernet/IP, MPLS tunnels, storage area networking communications, or the like. These are examples of how programmable network 101 may be controlled to support multiple forms of transport that differ dramatically in attributes corresponding to layers 2 and 3 of the well known OSI Reference Model.

The network control database 140 may include information that relates to, for example, virtual private network (VPN) connections from the subject user or device to other points served by programmable network 101. As a user or terminal device moves from one access point to another, this may have implications for the routing of traffic within programmable network 101. The present invention addresses this portability by the manner in which the access profile database 130 provides information on the connectivity the user expects and the network control database 140 determines how to best achieve the required connections through programmable network 101. Thus, as a user or terminal device moves from one access point to another, virtual private network connectivity may be automatically maintained.

In operation, when the terminal device 102a communicates a request to the controller 120 to initiate or change access communications involving the programmable network 101, the controller 120 may then consult or retrieve information from the access profile database 130 to determine how to accommodate the request. The signaling from the terminal device 102a may also express a request for communications or other types of services to be established through the programmable network 101. Given the request, the controller 120 may access the network control database 140 to determine the current network configuration and/or to retrieve instructions regarding how to reconfigure portions of the programmable network 101, the service edges 106a-c, and/or the access networks 104a-c.

The telecommunications network 100 may provide any complement of access services along any portion of the network. In practice, some portions may be less capable than others and the telecommunications network 100 may have to provide a somewhat reduced capability under some circumstances. Consequently, the access profile database 130 may include information, such as secondary preferences, concerning how to negotiate or reconcile desired access connection attributes expressed in a profile versus the specific capabilities of a particular service edge port or access connection that may have constrained capabilities.

As discussed above, the access profile database 130 generally includes information pertaining to specific users or devices whereas the network control database 140 maintains information about establishing communications through the programmable network 101. Changes to how services are provided for a particular individual or terminal device 102 may be reflected in the access profile database 130, and changes reflecting the topology or configuration of the programmable network 101 or changes to the control/management logic used for establishing communications through programmable network 101 would be applied in network control database 140.

It should be noted, however, that the access profile database 130 and the network control database 140 are illustrated as being separate databases for illustrative purposes only. Accordingly, the access profile database 130 and the network control database 140 may be a single database or multiple databases. Furthermore, one or both of the access profile database 130 and the network control database 140 may be incorporated into one or more of the network elements, such as the access network 104a-c, the programmable network 101, the controller 120, or the like.

In an embodiment, the controller 120 may express a desired communication configuration to be implemented in the programmable network 101 whereupon the programmable network 101, operating in conjunction with the network control database 140, implements the configuration request. Alternatively, as shown by connection 109, controller 120 may coordinate with, or act through, the network control database 140 to cause the necessary actions to take place in the programmable network 101.

Through the actions of either or both of the controller 120 or the network control database 140, the service edge 106 may be configured as needed to fulfill a request for access communications. This configuration may involve setting up the service edge 106 as a label switched path endpoint, reserving bandwidth, setting packet marking or policing behavior, resolving labels and tagged values used to identify traffic flows, and configuring interworking functions that adapt between different transport protocols. These configuration actions may also extend into network elements of the access network 104.

In an alternative embodiment, the programmable networks 101 may be interconnected via one or more inter-network gateways 150. In this embodiment, traffic may be routed between programmable networks 101, thereby allowing a user with access to one network to gain access to another network. For example, a user subscribing to frame relay services may move and connect a terminal device to a different access network that is not directly coupled to a frame relay network. According to teachings of the present invention, inter-network gateway 150 may be programmed such that traffic received from the user is routed to a programmable network capable of providing the frame relay services to the user.

It should be noted that, in accordance with the present teachings, it is desirable that telecommunications network 100 be capable of automatically inventorying its resources and automatically discovering new resources as they "come online." It is desirable that the telecommunications network 100 maintain a current provisioned status and an operational status of its resources. It is further desirable that the telecommunications network 100 maintain comprehensive SLA/QoS statistics pertaining to customer flows.

It should also be noted that the terminal device 102 may require programming or configuration in some manner. For example, in an IP network it may be desirable that the terminal device 102, be assigned a dynamic IP address from a dynamic host configuration protocol (DHCP) server. In another embodiment, however, the terminal device 102 may be allocated a block of IP addresses. The terminal device may then advertise (via, e.g., the exterior border gateway protocol (BGP)) to the service edge the location of the IP addresses associated with the terminal device.

Accordingly, embodiments of the present invention provide an agilely provisioned general-purpose service-providing network and provide for mobility and ubiquity of services, including access services. The provisioned services provided may include diverse types or forms of transport which differ dramatically in their OSI Reference Model Layer 2 and Layer 3 characteristics or by virtue of being packetized versus time-division multiplexed. In addition to providing exceptional convenience and responsiveness to a customer, the present invention is useful for fail-over and disaster recovery purposes.

Figure 2:
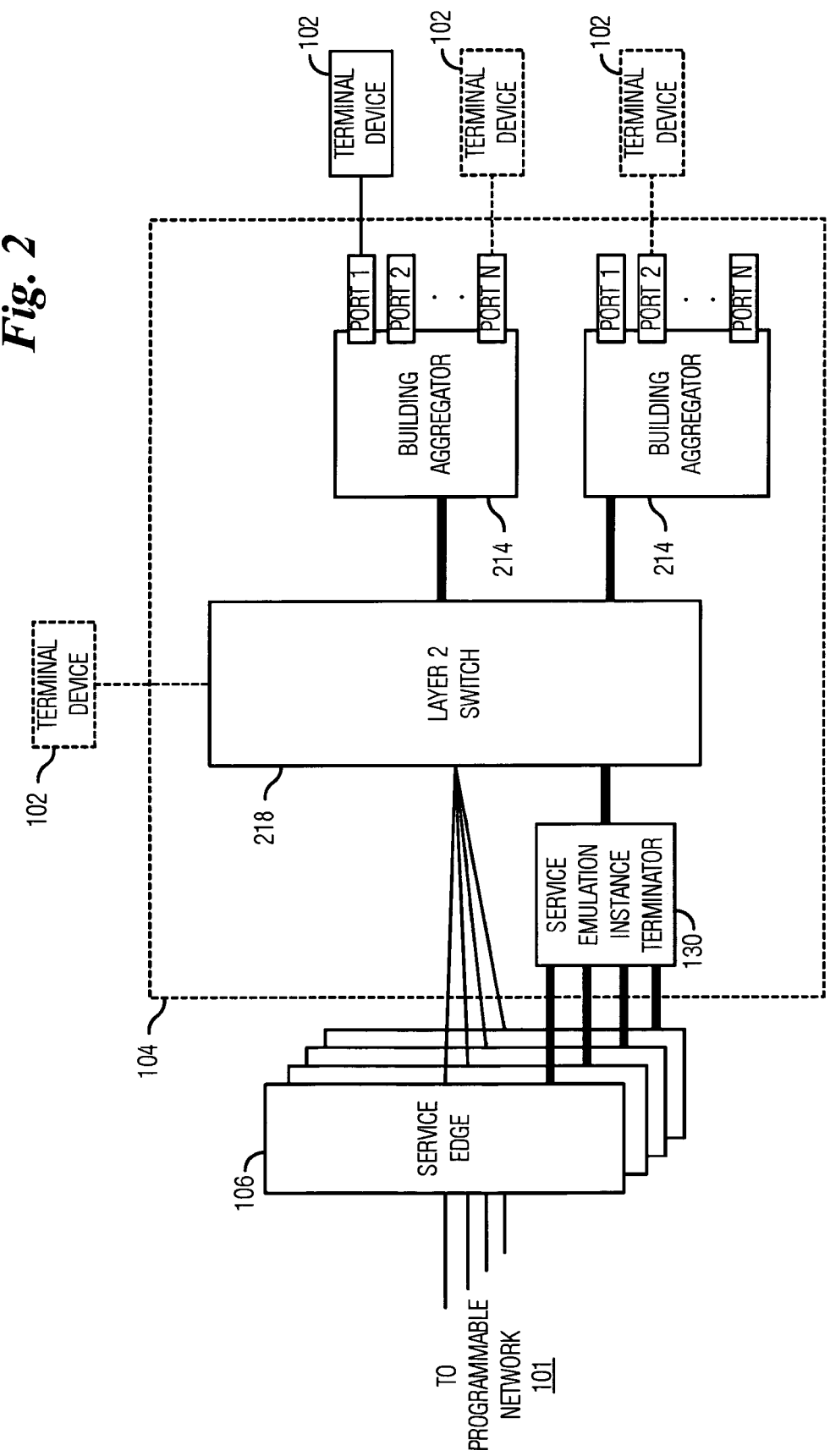
FIG. 2 is a network diagram in accordance with an embodiment of the present invention.

FIG. 2 is a network diagram in accordance with an embodiment of the present invention. In particular, FIG. 2 illustrates an example of an access network, such as access network 104 of FIG. 1, in which services may be emulated in accordance with an embodiment of the present invention. The emulation of services allows a single port to support multiple types of services. In this manner, as a user moves to a different terminal device coupled to a new port, or moves a terminal device to a new port, the new port may be reconfigured to emulate the type of services required by the user. It should be appreciated that the provisioning of this new port may be performed in an automatic and rapid manner, thereby decreasing delays and expenses and increasing revenues.

The access network 104 communicatively couples the terminal device 102 to one or more service edges 106 such that the terminal device 102 may access the services of the service edge 106. Generally, the service edge 106 represents the access point to a service provider's network, such as the programmable network 101.

The terminal device 102 is communicatively coupled to a building aggregator 214 and represents sources of different types of communications. For example, one of the sources may be an Ethernet customer coupled to a building aggregator 214 over any form of connectivity amenable to Ethernet traffic, such as a 100BaseT or DSL connection. Another source of traffic may be a private line customer, which may be coupled to a building aggregator 214 via DS1 line. Frame relay customers having their frame relay traffic carried over traditional TDM facilities such as DS1 lines to a building aggregator 214 and asynchronous transfer mode (ATM) customers having their ATM cell traffic carried over traditional TDM facilities such as DS1 lines to a building aggregator 214 are other examples of sources of communications. Other sources and types of communications may be used.

To provide connectivity toward service edge 106, the building aggregators 214 may be coupled to a layer 2 switch 218 via a communications link such as a DS3 communications link or the like. The layer 2 switch 218 provides switching and routing of traffic based upon information applied to the traffic, the information corresponding roughly to Layer 2 or the "data link layer" of the OSI Reference Model.

An example of a building aggregator 214 suitable for use with the present invention is disclosed in U.S. patent application Ser. No. 10/858,503, which is incorporated herein by reference. An example of a layer 2 switch 218 suitable for use with the present invention is disclosed in U.S. patent application Ser. No. 10/858,517, which is incorporated herein by reference.

It should be understood that the communications link communicatively coupling the building aggregator 214 and the layer 2 switch 218 may be any suitable communications link, such as an optical fiber, optical ring, a gigabit Ethernet (GbE) connection, or the like. It is also worth noting that the layer 2 switch 218 may be coupled to a large number of building aggregators 214 to perform an intermediate aggregation and distribution function within the access network 104 and that the layer 2 switch 218 may be coupled to other layer 2 switches to provide a network of interconnected layer 2 switches, providing aggregation and routing services throughout the access network. The layer 2 switch 218 may also be coupled directly to a terminal device.

In accordance with the present teachings, carrier-tagged flows are used in the access network 104 to provide a service-agnostic transport mechanism from the terminal device 102 to the service edge 106. Generally, carrier-tagged flows represent a logical communications channel or flow established to carry carrier-tagged communications between two or more parties, or two or more points, served by a communications system.

The carrier-tagged communications can be voice, data, audio, video, or any other type of communications. A carrier-tagged flow may be implemented using a service emulation instance, such as a pseudowire as described in an IETF's document entitled "draft-ietf-pwe3-arch-06.txt," and successive versions thereof. This technology allows a packet-switched network to emulate other types of packet or TDM transport services. For example, a pseudowire may be implemented in an Ethernet network, yet may provide transport of communications that mimic the attributes and performance of common data link protocols, such as ATM, frame relay, as well as SONET/SDH or DSn TDM signals. An Ethernet-based pseudowire may employ variable-length packets even when carrying fixed-length cells or frames, such as 53-byte ATM cells. A pseudowire is typically implemented along a tunnel implemented in a packet-switched network. Some types of tunnels that may be suitable for carrying pseudowires, or even other types of communications that may be employed in conjunction with the present teachings, include Label Switched Paths (LSPs) according to the MultiProtocol Label Switching (MPLS) protocol, Layer 2 Tunneling Protocol (L2TP) tunnels, IPsec tunnels, etc.

Another example of an implementation of a carrier-tagged flow is a logical networking tagged flow, such as a virtual local-area network (VLAN) or the like. A technique for achieving VLAN logical subnetworking is described in IEEE Standard 802.1Q. Briefly, a VLAN provides for designating and acting upon data packets in a manner that makes multiple LAN communication flows carried over a commonly shared communication path appear to be partitioned from one another as if traveling over separate, dedicated LAN connections. In accordance with an exemplary embodiment of the present teachings, a VLAN tagging approach may also be used for carrier-tagging of flows.

Carrier VLAN tags having significance for routing and processing in the access network are used to encapsulate and tag customer flows, which may or may not contain additional imbedded VLAN tags having significance within the customer's virtual network in accordance with typical 802.1Q usage. In accordance with the present teachings, the VLAN tagging approach is conveniently reused for carrier-tagging purposes and may be locally significant on any port, with tag values possibly being replaced on a hop-by-hop basis.

In accordance with the present teachings, carrier tags applied to traffic to support handling of flows through an access network, whether in the form of tunnel labels, pseudowire labels, VLAN tags, etc., may be 'stackable' to any depth to support efficient flow management in the context of hierarchical aggregation and distribution between service edge(s) and customer locations. In an embodiment, the building aggregators 214, or some other network element, can be equipped to serve as one end of a plurality of carrier-tagged flows.

Each carrier-tagged flow is identified by a carrier tag having a particular tag value. For example, a carrier-tagged flow implemented as a service emulation instance is identified by a service emulation instance mapping identifier. In the case in which a pseudowire is used as a service emulation instance, the service emulation instance mapping identifier may correspond to a pseudowire label. Carrier tags may be locally significant on any port and the tags can be swapped on a hop-by-hop basis as needed to provide a large number of flows using the finite number of identifier values that are available (approximately 1 million in the case of pseudowire labels). In this manner, switching in the access network can be simplified by encapsulating traffic in carrier-tagged flows and by interpreting and manipulating the corresponding carrier tags. The access network may transparently support a mixture of flow types and customer content, including any customer-specific addressing or virtual networking fields imbedded in the customer content. The pseudowire architecture as described in IETF's document entitled "draft-ietf-pwe3-arch-06.txt," and successive versions thereof, provides one example of a carrier-tagging approach involving encapsulation and labeling of traffic. It should be noted, however, that other protocols may be used, and embodiments of the present invention may be implemented with other types of protocols and physical connections.

In accordance with an embodiment of the present invention, the building aggregators 214 may couple traffic of various types, such as traffic from the terminal devices, onto the appropriate corresponding carrier-tagged flows that have been established to emulate the type of transport suitable for each type of traffic. It should be noted that while in an embodiment, the building aggregators 214 serve as one end of the carrier-tagged flow, other embodiments may be implemented in which the terminal devices 102, the layer 2 switch 218, the service edge 106, or some other intermediate device act as one end of the carrier-tagged flow.

In an exemplary embodiment, Ethernet is utilized as the layer 2 protocol over which carrier-tagged communications are transmitted. The application of Ethernet in the access network 104 can be based on TDM encapsulation, using X.86 or GFP, e.g. Ethernet over SONET (EoS). While Ethernet is desirable for supporting variable length packets, other protocols may be used.

Thus, the use of carrier-tagged flows within the access network allows the terminal device 102 to be moved from a first location to a second location. For example, as illustrated by the dotted lines, the access network 104 may be moved from Port 1 to Port N of the same building aggregator, from one building aggregator to a port of another building aggregator, or from a building aggregator to a port coupled directly to the layer 2 switch 218, or the like.

In the discussion that follows, MPLS tunnels and pseudowires are used as examples of carrier-tagged paths for illustrative purposes only. Other types of carrier-tagged paths, such as logical networking tagged flows and other types of service emulation instances, may be used.

The use of carrier-tagged flows within the access network is described in greater detail in U.S. patent application Ser. Nos. 10/858,502, 10/858,501, 10/860,803, 10/858,491, 10/858,503, 10/858,517, 10/858,868, 10/860,609, and 10/858,525, corresponding to, respectively.

In accordance with the teachings of the present invention, the use of carrier-tagged flows within the access networks together with the programmable networks provide a service-agnostic telecommunications network that allows a user to move from location to location and/or from device to device. The service characteristics corresponding to the users subscription is utilized to reroute and groom the customer's traffic to the new location. In an embodiment, the rerouting of the traffic may be performed by modifying the appropriate entries in the relevant network elements forwarding information base (FIB) to reflect the correct labels and/or switching instructions.

Figure 3:
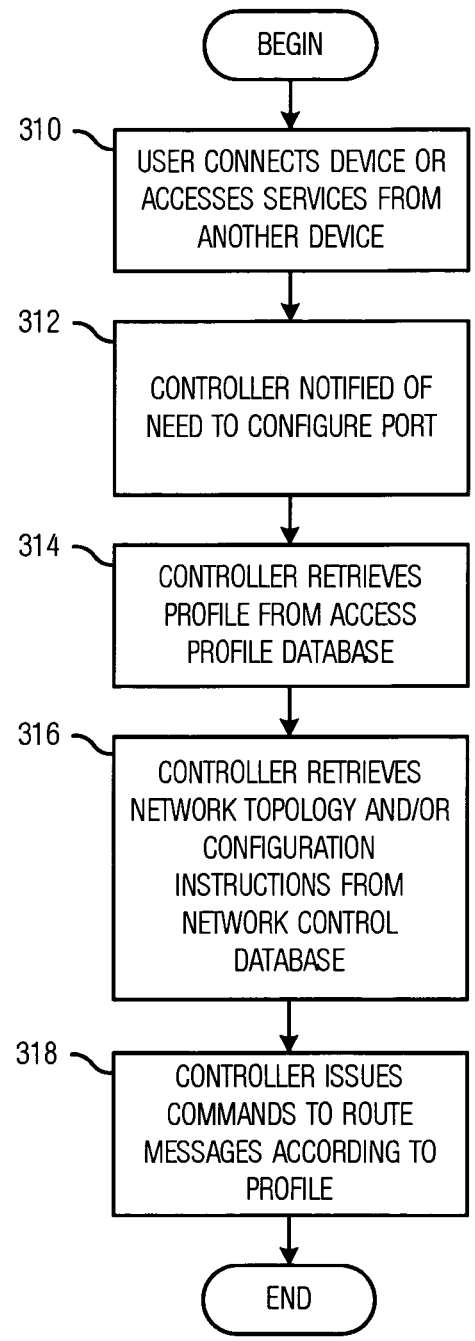
FIG. 3 is a data flow diagram depicting steps that may be performed in accordance with an embodiment of the present invention.

FIG. 3 is a data flow diagram depicting steps that may be performed in accordance with an embodiment of the present invention. In an embodiment, the steps depicted in FIG. 3 may be performed to modify the routing instructions of a user's traffic. The process begins in step 310, wherein the user connects a terminal device, e.g., terminal device 102a of FIG. 1, to the access network or indicates that the user's services are desired to be accessed from another terminal device.

In step 312, the controller 120 (FIG. 1) is notified of the need to reconfigure the network in accordance with the service and the type of service to which the user subscribes. The controller 120 may be notified via the signaling connection 108 (FIG. 1) of the need to reconfigure the network by any suitable means, such as by polling for new connections, by a service request submitted electronically by the user, by a service request submitted by phone, fax, mail, or other manual methods, by an electronic request sent automatically or manually by the terminal device, or the like. In another embodiment, a web page is provided that allows a user to request a service change, which may be automatically verified and fulfilled by a provisioning system in the controller.

In response to receiving a service request, the controller 120 retrieves an access profile from the access profile database 130 in step 314. As discussed above, the access profile contains information related to the specific service to which the user subscribes. The information may include, for example, type of service, bandwidth, QoS parameters, or the like.

Next, in step 316, the controller 120 retrieves network topology information and/or configuration instructions. In an embodiment, the controller 120 retrieves network topology information from the network control database 140. In this embodiment, the controller 120 utilizes the network topology to determine the required path. In another embodiment, the network control database 140 may contain instructions that may be performed by the controller 120 and/or one or more network elements within the programmable network 101 to reconfigure the relevant network elements to provide the requested service to the user.

In step 318, the controller performs or causes to be performed the necessary actions to reconfigure the programmable network 101 and/or the access network 104. One method that may be used to configure the programmable network 101 utilizes the Label Distribution Protocol (LDP) and the Resource Reservation Protocol-Traffic Engineering (RSVP-TE) (or Constraint Routed LDP (CR-LDP)) signaling protocol to establish a traffic-engineered MPLS PSN tunnel, often bi-directionally. A tunnel, path, route or flow may be established through the access network 104, the programmable network 101 or even continuously through both in an "access-core-access" fashion.

One method of provisioning the access network 104 is described in U.S. patent application Ser. No. 10/858,525, which is incorporated herein by reference.

Thereafter, the programmable network 101 and/or the access network 104 have been reconfigured to provide the appropriate services to the user on the new port and/or terminal device. Accordingly, the procedure described above may be utilized to quickly reconfigure the appropriate network elements and to provide the appropriate services to the user in the new location. In this manner, service times are reduced, cutting expenses and increasing revenues.

FIG. 4 is a message flow diagram that may be used in accordance with an embodiment of the present invention. FIG. 4 is only an example of the interaction between various network elements in an embodiment of the present invention. It should be noted, however, that other messages, network elements, and interactions between network elements may be utilized.

Initially, a message 410 is sent from the terminal device 102 to the controller 120. As discussed above, the request may be sent electronically or manually. In an embodiment, the request is generated automatically by the terminal device 102 or the access network 104. The access network 104 may be configured to detect a newly connected device and retrieve a unique user identifier or a machine identifier. In another embodiment, the message may be generated by a user logging onto a provisioning system to request that the network be reconfigured to provide the user's services on a new port and/or terminal device. The user identifier or machine identifier may then be used by the controller 120 to retrieve a device/user profile from the access profile database, as indicated by message 412.

Once the user/device profile is obtained, the controller 120 may retrieve a network topology and/or instructions required to reconfigure the programmable network 101 and/or the access network 104 as indicated by message 414. Thereafter, the controller 120 sends one or more messages 416 to the affected network elements to reconfigure the user's service, and a message 418 may be sent to the terminal device 102 to indicate that reconfiguration is complete.

In an alternative embodiment, the network control database 140 may take a more active role. In this alternative embodiment, the controller 120 may send a message to the network control database 140 indicating the reconfiguration that needs to occur. The network control database 140 may store instructions necessary to perform the reconfiguration, and upon receiving the message indicating the reconfiguration, the network control database 140 may issue the instructions directly to the affected network elements.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing a service-agnostic network resource for communications supporting a plurality of forms of transport, the method comprising:

receiving an indication that a user is coupled to a point of access to the service-agnostic network resource and is requesting a set of transport services corresponding to one or more of the different forms of transport;

retrieving an access profile associated with the user, the access profile including service parameters for transport services to be made available to the user; and causing an access network and a programmable network to be configured to provide the set of transport services at the point of access in accordance with the access profile, wherein the service-agnostic network resource automatically, based upon identification of a first terminal device or identification of the user, establishes virtual private network connectivity at a new location of the first terminal device as was provided at a previous location of the first terminal device.

2. The method of claim 1, wherein the set of transport services comprises a mixture of different forms of transport.

3. The method of claim 1, wherein the set of transport services comprises a mixture of forms of transport conforming to different OSI layer 2 communication protocols.

4. The method of claim 1, wherein the set of transport services comprises a mixture of different forms of transport, with at least one form of transport involving packet data and another form of transport involving time-division multiplexed signals.

5. The method of claim 1, wherein the access network is a packet access network.

6. The method of claim 1, wherein the user requests services via a new terminal device different from that previously used by the user.

7. The method of claim 1, wherein the indication identifies a specific user or a specific terminal device.

8. The method of claim 1, wherein the user requests transport services via the first terminal device upon moving the terminal device to the new location from the previous location and wherein the service-agnostic network resource automatically, based upon identification of the terminal device or identification of the user, establishes the same set of transport services at the new location as were provided at the previous location.

9. The method of claim 1, wherein the programmable network comprises a plurality of transport networks, at least two of which employ differing forms of transport.

10. The method of claim 1, wherein the causing includes retrieving network information from a network control database.

11. The method of claim 10, wherein the network information includes network topology.

12. The method of claim 10, wherein the network information includes configuration instructions or parameters.

13. The method of claim 1, wherein the access profile is retrieved from an access profile database.

14. The method of claim 1, wherein the causing is performed by causing a network control database to issue instructions to one or more network elements.

15. The method of claim 1, wherein the service-agnostic network resource comprises a plurality of programmable networks interconnected by one or more inter-network gateways and wherein the providing the set of transport services involves configuring communications from the user to be carried by a plurality of the programmable networks via the inter-network gateways.

16. A system for providing a service-agnostic network resource for communications supporting a plurality of forms of transport, the system comprising:
a controller communicatively coupled to one or more programmable networks; an access profile database communicatively coupled to the controller; and
a network control database communicatively coupled to the controller;
wherein the controller is configured to
receive an indication that a user is coupled to a point of access to the service-agnostic network resource and is requesting a set of transport services corresponding to one or more of the different forms of transport;
retrieve an access profile associated with the user, the access profile including service parameters for transport services to which the user subscribes; and
cause a programmable network to be configured to provide the set of transport services at the point of access in accordance with the access profile, and
wherein the service-agnostic network resource automatically, based upon identification of a first terminal device or identification of the user, establishes virtual private network connectivity at a new location of the first terminal device as was provided at a previous location of the first terminal device.

17. The method of claim 16, wherein the set of transport services comprises a mixture of different forms of transport.

18. The system of claim 16, wherein the set of transport services comprises a mixture of forms of transport conforming to different OSI layer 2 communication protocols.

19. The system of claim 16, wherein the set of transport services comprises a mixture of different forms of transport, with at least one form of transport involving packet data and another form of transport involving time-division multiplexed signals.

20. The system of claim 16, wherein the access network is a packet access network.

21. The system of claim 16, wherein the user requests services via a new terminal device different from a terminal device previously used by the user.

22. The system of claim 16, wherein the indication identifies a specific user or a specific terminal device.

23. The system of claim 16, wherein the user requests transport services via the first terminal device upon moving the terminal device to the new location from the previous location and wherein the controller directs the programmable networks to automatically, based upon identification of the terminal device or identification of the user, establish the same set of transport services at the new location as were provided at the previous location.

24. The system of claim 16, wherein the programmable network comprises a plurality of transport networks, at least two of which employ different forms of transport.

25. The system of claim 16, wherein the one or more programmable networks are configured based on network information retrieved from the network control database.

26. The system of claim 25, wherein the network information includes network topology.

27. The system of claim 25, wherein the network information includes configuration instructions or parameters.

28. The system of claim 16, wherein the access profile is retrieved from the access profile database.

29. The system of claim 16, wherein the causing is performed by causing the network control database to issue instructions to one or more network elements.

30. The system of claim 16, further comprising a plurality of programmable networks interconnected by one or more inter-network gateways.

31. The system of claim 16, wherein the controller causes the programmable network to be reconfigured by retrieving network topology from the network control database and issuing reconfiguration commands to one or more network elements.

32. The system of claim 16, wherein the controller is communicatively coupled to one or more access networks coupled to the programmable networks and wherein the controller is configured to control the access networks in accordance with the access profile.

* * * * *